(12) United States Patent
Risager et al.

(10) Patent No.: US 10,777,828 B2
(45) Date of Patent: Sep. 15, 2020

(54) SINGLE-INTERFACE CONNECTOR ASSEMBLY FOR HEARING DEVICE FUEL CELL POWER PACK

(71) Applicant: Widex A/S, Lynge (DK)

(72) Inventors: Flemming Risager, Naestved (DK); Jorgen Landgrebe Andreasen, Copenhagen K (DK); Michael Frydendal Larssen, Naestved (DK); Per Kokholm Sorensen, Virum (DK); Drew Rosskelly, Copenhagen K (DK)

(73) Assignee: Widex A/S, Lynge (DK)

( * ) Notice: Subject to any disclaimer, the term of this patent is extended or adjusted under 35 U.S.C. 154(b) by 576 days.

(21) Appl. No.: 15/346,882

(22) Filed: Nov. 9, 2016

(65) Prior Publication Data

US 2017/0133694 A1   May 11, 2017

(30) Foreign Application Priority Data

Nov. 9, 2015  (EP) .................................... 15193662

(51) Int. Cl.
| | |
|---|---|
| *H01M 8/04082* | (2016.01) |
| *H04R 25/00* | (2006.01) |
| *H01M 8/04186* | (2016.01) |
| *H01M 2/36* | (2006.01) |
| *H01M 8/1011* | (2016.01) |
| *H01M 8/04119* | (2016.01) |

(52) U.S. Cl.
CPC ....... *H01M 8/04208* (2013.01); *H01M 2/361* (2013.01); *H01M 8/04179* (2013.01); *H01M 8/04186* (2013.01); *H01M 8/1011* (2013.01); *H04R 25/556* (2013.01); *H01M 2250/30* (2013.01); *H04R 2225/31* (2013.01); *Y02B 90/18* (2013.01); *Y02E 60/523* (2013.01)

(58) Field of Classification Search
None
See application file for complete search history.

(56) References Cited

U.S. PATENT DOCUMENTS

| | | | | |
|---|---|---|---|---|
| 2006/0006108 | A1* | 1/2006 | Arias | ............... H01M 8/04208 |
| | | | | 210/232 |
| 2006/0229498 | A1* | 10/2006 | Kohno | ................... A61B 1/015 |
| | | | | 600/158 |
| 2011/0039176 | A1* | 2/2011 | Patolsky | ................. H01M 4/90 |
| | | | | 429/428 |

FOREIGN PATENT DOCUMENTS

| | | |
|---|---|---|
| WO | 2007/020489 A1 | 2/2007 |
| WO | WO-2007020489 A1 * | 2/2007 ........ H01M 8/04186 |
| WO | 2007/027767 A2 | 3/2009 |

OTHER PUBLICATIONS

Extended European Search Report of 15193662.2-1360, dated Feb. 9, 2016.

* cited by examiner

*Primary Examiner* — Zhongqing Wei
(74) *Attorney, Agent, or Firm* — Sughrue Mion, PLLC

(57) ABSTRACT

The present invention relates to a hearing device fuel cell power pack comprising a connector part of a connector assembly for exchanging fluids between the hearing device fuel cell power pack and a hearing device docking station, the connector part comprising a moveable valve piston being adapted to move between a closed valve position and an open valve position. The connector part forms part of a single-interface fuel cell connector assembly.

19 Claims, 3 Drawing Sheets

SINGLE-INTERFACE CONNECTOR ASSEMBLY FOR HEARING DEVICE FUEL CELL POWER PACK

FIELD OF THE INVENTION

The present invention relates to a single-interface fuel cell connector assembly for miniature fuel cell power packs. In particular, the present invention relates to a single-interface connector assembly for miniature fuel cell power packs for hearing devices, such as hearing aids.

BACKGROUND OF THE INVENTION

Hearing devices, such as hearing aids, of today are typically powered by batteries. Hearing device batteries are typically to be changed every fourth or fifth day. This rather frequent change of batteries is relative expensive. In case a rechargeable battery is being used to power a hearing device such battery is typically to be charged every night. This charging process is a rather time consuming process.

Thus, there seems to be a need for alternative power supplies for hearing devices and equipment for proper and secure handling thereof.

It may be seen as an object of embodiments of the present invention to provide a miniature single-interface fuel cell connector assembly that takes up only very little space.

It may be seen as a further object of embodiments of the present invention to provide a miniature single-interface fuel cell connector assembly having a plurality of supply canals.

BRIEF DESCRIPTION OF THE INVENTION

The above-mentioned objects are complied with by providing, in a first aspect, a hearing device fuel cell power pack comprising a connector part of a connector assembly for exchanging fluids between the hearing device fuel cell power pack and a hearing device docking station, the connector part comprising a moveable valve piston being adapted to move between a closed valve position and an open valve position.

In the present context a hearing device docking station is to be understood as a device being adapted to ease connection between a hearing device fuel cell power pack and a cartridge, said cartridge at least containing the fuel to be provided to the hearing device fuel cell power pack. The cartridge may optionally be configured for also receiving waste products from the hearing device fuel cell power pack. Thus, the hearing device docking station is adapted to ease the exchange of fluids between the hearing device fuel cell power pack and a cartridge when both are connected to the hearing device docking station.

In the closed valve position no exchange of fluids is possible, whereas in the open valve position a plurality of fluid canals are opening so that fuel, waste products and air may be exchanged between the hearing device fuel cell power pack and a hearing device docking station. The opened fluid canals may go through the moveable valve piston and/or they may go around the moveable valve piston.

In the present content hearing device fuel cell power pack should be understood as a power supply for hearing devices, such as hearing aids. The fuel cell power pack typically generates electrical power by consuming methanol.

The connector part may form part of a connector assembly, such as a space saving single-interface connector assembly having a male and a female connector part. The connector part of the hearing device fuel cell power pack may form the female connector part of the assembly.

It is advantageous that the connector part is in its closed state (closed valve position) when the hearing device fuel cell power pack is not positioned in the hearing device docking station. When the power pack is positioned in the docking station the connector part is in its open state (open valve position) which allows exchange of fuel, waste product and pressure releasing air.

The connector part may further comprise a valve spring for spring loading the moveable valve piston inside a valve tube. The moveable valve piston may be spring loaded in a longitudinal direction of the valve tube. Thus, the moveable valve piston may be moved between the closed valve position and the open valve position by performing a translation movement within the valve tube. In the closed valve position of the moveable valve piston the valve spring may be less tensioned compared to the open valve position.

The connector part may further comprise a combined sealing and retention member. The combined sealing and retention member may be positioned at or near an end opening of the valve tube. The moveable valve piston, which may be at least partly positioned inside the valve tube, may be spring loaded against the combined sealing and retention member in the closed valve position. Thus, the spring loading of the moveable valve piston against the combined sealing and retention member may ensure that the connector part is in a closed state when the hearing device fuel cell power pack is not positioned in the hearing device docking station.

As mentioned above the connector part may be a female connector part, where the moveable valve piston may be adapted to be displaced to its open valve position by inserting a male connector part of the connector assembly at least partly into the female connector part. The male connector part may form part of a hearing device docking station. The female connector part may, in its open valve position, comprise a plurality of canals for exchanging fluids, such as fuel, waste products, air etc., between the hearing device fuel cell power pack and the hearing device docking station. Thus, the female connector part may comprise a canal for exchanging fuel and/or waste products between the hearing device fuel cell power pack and the hearing device docking station. Also, an air pressure release canal for exchanging air between the hearing device fuel cell power pack and the hearing device docking station may be provided.

The hearing device fuel cell power pack of the present invention may further comprise a fuel tank and a power pack.

In a second aspect the present invention relates to a single-interface fuel cell connector assembly to be used with a hearing device fuel cell power pack, the connector assembly comprising
 a first connector part, and
 a second connector part for receiving at least part of the first connector part
 wherein the connector assembly, when assembled, comprises a plurality of through-going canals for exchanging fluids between the hearing device fuel cell power pack and a hearing device docking station.

Thus, according to the second aspect of the present invention relates a user friendly single-interface assembly for connecting a hearing device fuel cell power pack to a hearing device docking station is provided.

The single-interface fuel cell connector assembly may be considered assembled when the first connector part is at least partly inserted into the second connector part. The first connector part may comprise a male connector part. This male connector part may be secured to or may form part of a hearing device docking station. The second connector part may comprise a female connector part which may be secured to or may form part of a hearing device fuel cell power pack.

A combined sealing and retention member may hold the first connector part in a correct position within the second connector part. The combined sealing and retention member may be manufactured in a resilient material, such as for example rubber or a thermo plastic elastomer. The combined sealing and retention member may form part of the second connector part.

The single-interface fuel cell connector assembly of the present invention is intended to be used for hearing device fuel cell power packs. As power packs are very limited in size the overall outer diameter of the connector assembly may be less than 3 mm, such as less than 2.5 mm, such as less than 2 mm.

BRIEF DESCRIPTION OF THE DRAWINGS

The present invention will now be described in further details with reference to the accompanying figures, wherein.

Figure 1:
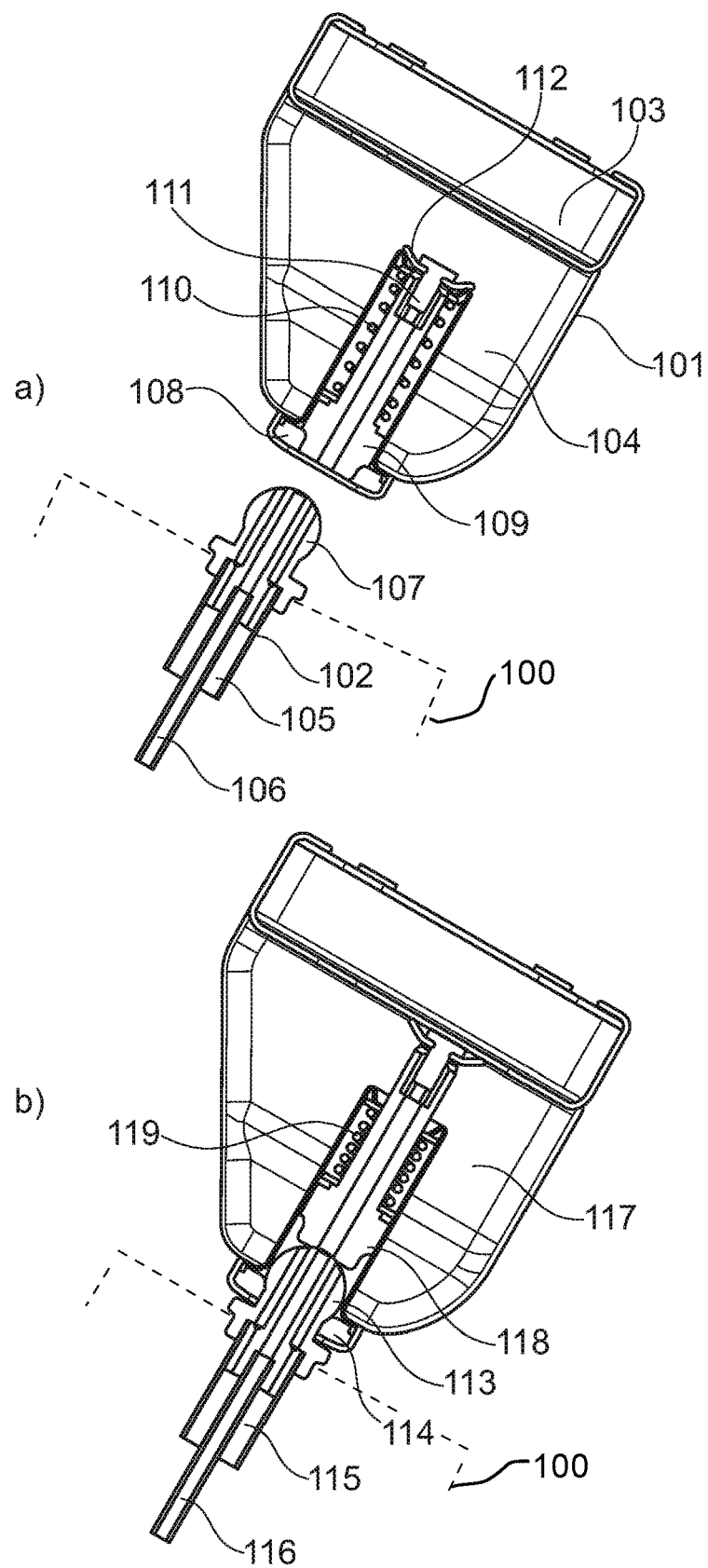
FIG. 1 shows a cross-sectional view of the connector assembly of the present invention.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its broadest aspect the present invention relates to a single-interface connector assembly for hearing device fuel cell power packs. The single-interface connector assembly comprises a male part and a female part. The male part typically forms part of a hearing device docking station, whereas the female part forms part of a hearing device fuel cell power pack. Thus, when the fuel cell power pack is positioned in the docking station fuel, waste products and pressure releasing air can be exchanged via the single-interface connection assembly according to the present invention. The present invention also relates to the hearing device fuel cell power pack comprising a connector part being adapted to engage with another connector part forming part of a hearing device docking station.

Referring now to FIG. 1 the single-interface connector assembly of the present invention is depicted. In FIG. 1a the male 102 and female parts are separated, whereas in FIG. 1b the male 102 and female parts are engaged. As mentioned above the male part 102 typically forms part of a hearing device docking station (shown schematically in dotted line at 100 in FIG. 1), whereas the female part forms part of a hearing device fuel cell power pack 101 comprising a power pack 103 and a fuel tank 104.

The male part 102 comprises two through-going canals in that one canal 105 is adapted to guide fuel to the tank 104, or alternatively remove waste products from the tank 104. Such waste products may involve remains of fuel, water or other products. The fuel for a hearing device fuel cell power pack is typically methanol. Moreover, the male part 102 further includes an air canal 106 being adapted to guide pressure releasing air either to or from the tank 104. Thus, in case waste products are to be removed from the tank via canal 105 pressure releasing air is guided to the tank simultaneously via air canal 106. Also, in case fuel is to be provided to the tank 104 via canal 105 pressure releasing air is allowed to escape from the tank 104 via air canal 106. The fuel/waste 105 canal as well as the air ventilation canal 106 is extended into a mushroom-shaped front portion 107 of the male part 102.

The female part of the assembly is secured to or integrated with the hearing device fuel cell power pack 101. The female part comprises a spring loaded piston 109 with a piston plug 111 and a top seal attached 112 thereto. The top seal 112 forms a sealing to the valve tube, cf. FIG. 2, when the female part is closed. The spring loading of the piston 109 is provided by valve spring 110. The female part further comprises a combined sealing/retention member 108 to which sealing/retention member 108 the spring loaded piston 109 is biased when the male part is absent, i.e. not inserted into the female part.

When the male part 101 is inserted into the female part, cf. FIG. 1b, the valve spring 119 is compressed due to the displacement of the piston 118. The combined sealing/retention member 114 is now biased against the mushroom-shaped front portion 113 of the male part. Upon insertion of the male part into the female part the mushroom-shaped front portion 113 passes the sealing/retention member 114. When inserting the male part into the female part the user will experience a tactile feeling when the mushroom-shaped front portion 113 passes the combined sealing/retention member 114. Thus, the user will have a clear feeling as to when the male part has been correctly positioned in the female part.

Figure 2:
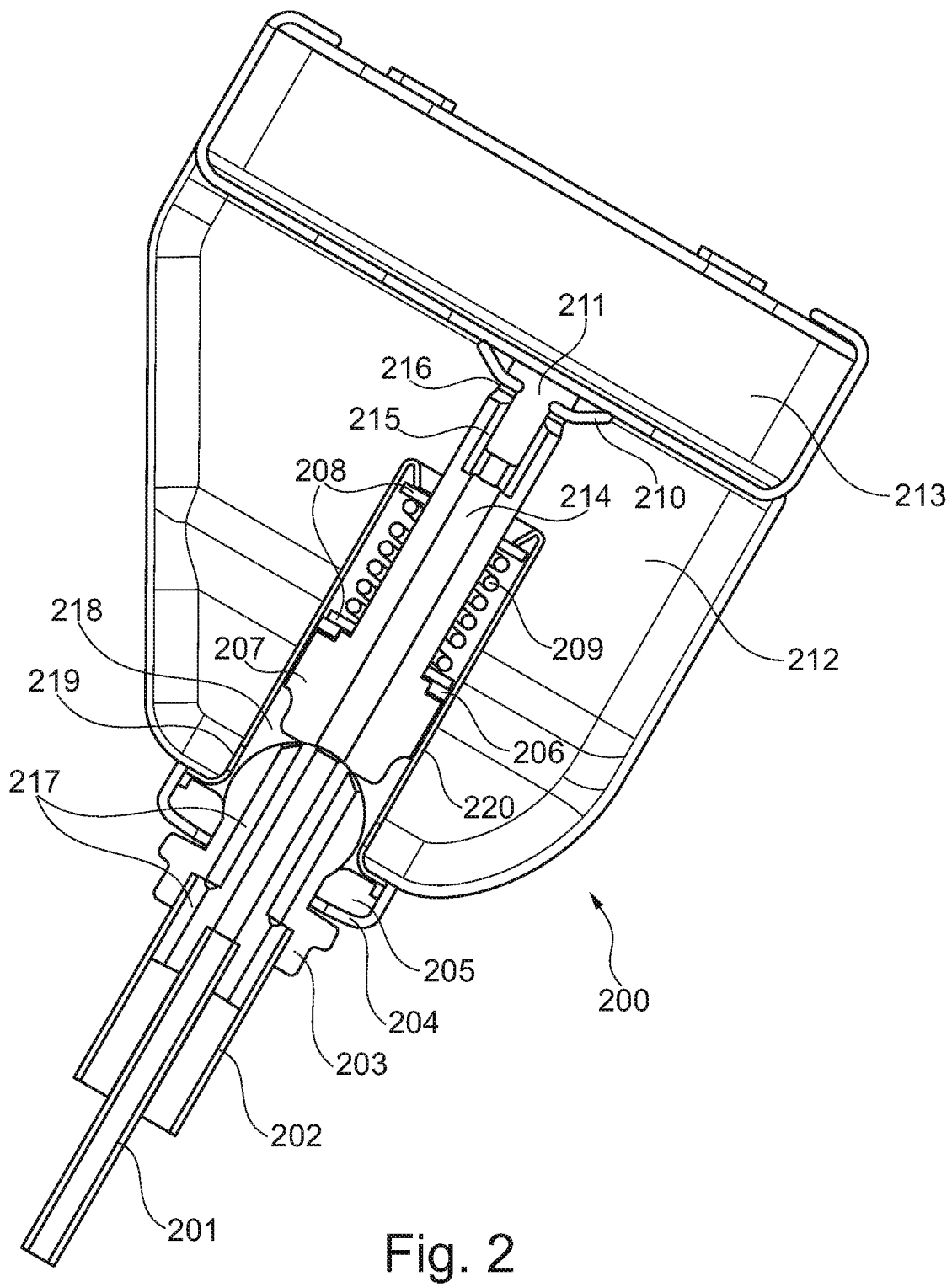
FIG. 2 shows an enlarged cross-sectional view of the connector assembly when connected.

Referring now to FIG. 2 an enlarged version 200 of FIG. 1b is shown. As seen in FIG. 2 the male part again comprises concentrically arranged air tube 201 and fuel/waste tube 202. The mushroom-shaped front portion 203 is fixed in position by the combined sealing/retention member 205 of the female part. A valve cover 204 keeps the combined sealing/retention member 205 in position. Similar to FIG. 1b air is allowed to enter or leave the fuel tank 212 via the air tube 201, the centre passage 214 in the valve piston 207, the passage 215 around the piston plug 211 and the opening 216 to the fuel tank 212. The piston plug 211 holds a top seal 210 which abuts the power pack 213 when the valve piston 207 is in its displaced and thereby open position. In the displaced position of the valve piston 207 the valve spring 209 is compressed between the two washers 208. Fuel and/or waste products are allowed to enter or leave the fuel tank 212 via the fuel/waste tube 202, the passage 217, the intermediate room 218 and the opening 219 in the valve tube 220.

Figure 3:
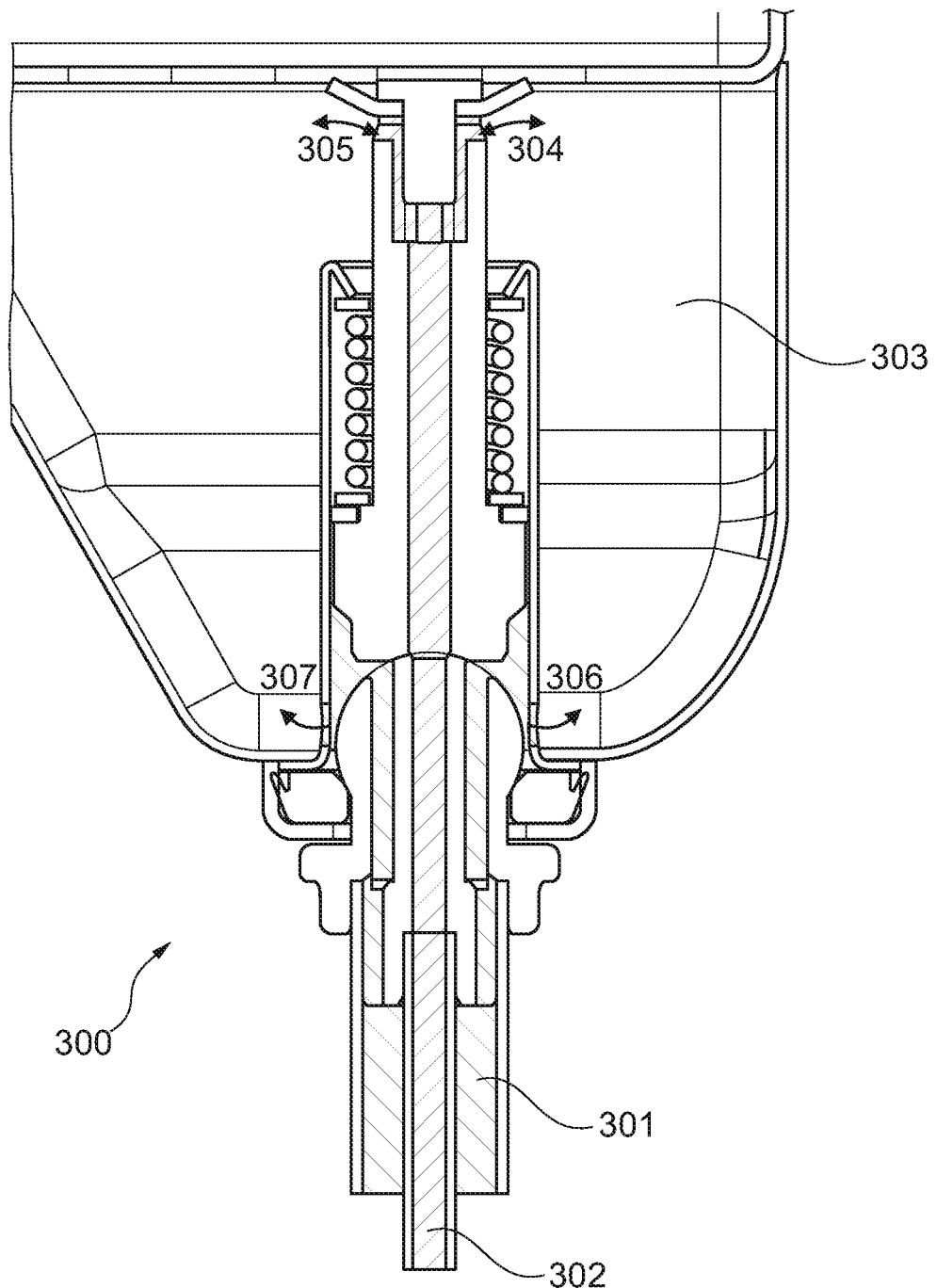
FIG. 3 illustrates the fuel/waste and air flow within the connector assembly when connected.

FIG. 3 illustrates the air passage 302 through the connector assembly 300 of the present invention and into the fuel tank 303 via openings 304, 305. FIG. 3 also illustrates the fuel/waste passage 301 through the connector assembly 300 and into the fuel tank 303 via openings 306, 307.

The invention claimed is:

1. A single-interface fuel cell connector assembly to be used with a hearing device fuel cell power pack, the connector assembly comprising a first connector part, and a second connector part, for receiving at least part of the first connector part, wherein the connector assembly, when assembled, comprises a plurality of through-going canals for exchanging fluids between the hearing device fuel cell power pack and a hearing device docking station, and wherein one of said first and second connector parts includes a valve piston movable in an axial direction on assembly of said connector assembly from a closed position to an open position in which said through-going canals are open for exchanging said fluids between the fuel cell power pack and the hearing device docking station.

2. A hearing device fuel cell power pack comprising a connector part of a connector assembly for exchanging fluids through a plurality of through-going canals between the hearing device fuel cell power pack and a hearing device docking station, the connector part comprising a valve piston configured to move, on assembly of said connector assembly, in an axial direction from a closed valve position to an open valve position in which said through-going canals are open for exchanging said fluids.

3. The hearing device fuel cell power pack according to claim 1, wherein the connector part further comprises a valve spring for spring loading the moveable valve piston inside a valve tube.

4. The hearing device fuel cell power pack according to claim 1, wherein the connector part further comprises a combined sealing and retention member, and wherein the moveable valve piston is spring loaded against the combined sealing and retention member in the closed valve position.

5. The hearing device fuel cell power pack according to claim 1, wherein the connector part is a female connector part configured to receive a male connector part attached to said docking station, and wherein the moveable valve piston is adapted to be displaced to its open valve position by inserting the male connector part of the connector assembly at least partly into the female connector part.

6. The hearing device fuel cell power pack according to claim 5, wherein the female connector part, in its open valve position, comprises said plurality of canals for exchanging fluids between the hearing device fuel cell power pack and the hearing device docking station.

7. The hearing device fuel cell power pack according to claim 6, wherein the female connector part comprises a canal for exchanging fuel and/or waste products between the hearing device fuel cell power pack and the hearing device docking station.

8. The assembly according to claim 7, wherein the female second connector part comprises an air pressure release canal for exchanging air between the hearing device fuel cell power pack and the hearing device docking station.

9. The hearing device fuel cell power pack according to claim 6, wherein the female connector part comprises an air pressure release canal for exchanging air between the hearing device fuel cell power pack and the hearing device docking station.

10. The hearing device fuel cell power pack according to claim 1, further comprising a fuel tank and a power pack.

11. The single-interface fuel cell connector assembly according to claim 1, wherein the connector assembly is assembled when the first connector part is at least partly inserted into the second connector part.

12. The single-interface fuel cell connector assembly according to claim 1, wherein a combined sealing and retention member holds the first connector part in a predetermined position within the second connector part.

13. The single-interface fuel cell connector assembly according to claim 12, wherein the combined sealing and retention member forms part of the second connector part.

14. The single-interface fuel cell connector assembly according to claim 1, wherein the first connector part comprises a male connector part, and wherein the male connector part is secured to or forms part of a hearing device docking station.

15. The single-interface fuel cell connector assembly according to claim 1, wherein the second connector part comprises a female connector part, and wherein the female connector part is secured to or forms part of a hearing device fuel cell power pack.

16. The single-interface fuel cell connector assembly according to claim 1, wherein a portion of said second connector part surrounding said first connector part has an outer diameter of less than 3 mm.

17. The single-interface fuel cell connector assembly according to claim 16, wherein said outer diameter is less than 2.5 mm.

18. The single-interface fuel cell connector assembly according to claim 17, wherein said outer diameter is less than 2 mm.

19. A fluid exchange assembly comprising a hearing device docking station and a hearing device fuel cell power pack interconnected by a fuel cell connector assembly according to claim 1, said hearing device docking station incorporating said first connector part, and said hearing device fuel cell power pack incorporating said second connector part.

* * * * *